(12) United States Patent
Bedell et al.

(10) Patent No.: US 7,836,178 B1
(45) Date of Patent: Nov. 16, 2010

(54) TECHNIQUE FOR LIMITING ACCESS TO THE RESOURCES OF A SYSTEM

(75) Inventors: Jeffrey A. Bedell, Arlington, VA (US); Benjamin Z. Li, Great Falls, VA (US); Wenfeng Li, Reston, VA (US); Luis V. Orozco, Vienna, VA (US); Ramprasad Polana, Sterling, VA (US); Ramkumar Ramachandran, Reston, VA (US); Jun Yuan, Sterling, VA (US)

(73) Assignee: MicroStrategy Incorporated, McLean, VA (US)

( * ) Notice: Subject to any disclaimer, the term of this patent is extended or adjusted under 35 U.S.C. 154(b) by 2315 days.

(21) Appl. No.: 10/166,044

(22) Filed: Jun. 11, 2002
(Under 37 CFR 1.47)

Related U.S. Application Data

(63) Continuation of application No. 10/043,258, filed on Jan. 14, 2002, now abandoned, which is a continuation of application No. 09/884,470, filed on Jun. 20, 2001, now abandoned.

(51) Int. Cl.
*G06F 15/173* (2006.01)
(52) U.S. Cl. ...................... 709/225; 709/223
(58) Field of Classification Search ................. 709/225, 709/226, 223
See application file for complete search history.

(56) References Cited

U.S. PATENT DOCUMENTS

| 4,688,195 | A | | 8/1987 | Thompson |
| 4,829,423 | A | | 5/1989 | Tennant |
| 4,876,643 | A | | 10/1989 | McNeill |
| 5,197,005 | A | | 3/1993 | Shwartz |
| 5,276,870 | A | | 1/1994 | Shan |
| 5,418,943 | A | | 5/1995 | Borgida |
| 5,421,008 | A | | 5/1995 | Banning |
| 5,469,560 | A | | 11/1995 | Beglin |
| 5,504,890 | A | | 4/1996 | Sanford |
| 5,550,968 | A | * | 8/1996 | Miller et al. ................ 715/741 |
| 5,551,023 | A | | 8/1996 | Alonso |
| 5,555,403 | A | | 9/1996 | Cambot |
| 5,584,024 | A | | 12/1996 | Shwartz |

(Continued)

OTHER PUBLICATIONS

Alan Robertson, Linux—HA Heartbeat System Design, Proceedings of the 4th Annual Linux Showcase & Conferences, Atlanta, Oct. 10-14, 2000, 12 pages.

(Continued)

*Primary Examiner*—Ramsey Refai
(74) *Attorney, Agent, or Firm*—Hunton & Williams, LLP

(57) ABSTRACT

A technique for limiting access to the resources of a system is disclosed. In one embodiment, wherein the system has a server for processing requests, and wherein the server supports a plurality of projects, the technique includes receiving a request to access the resources of the system. The request is denied based upon an application level and a setting level, wherein the application level is associated with one of a plurality of functional layers within the system that is affected by the request, and wherein the setting level is a limiting value associated with one of the server alone and the server with one or more of the plurality of projects. The limiting value limits an operation on one of the plurality of functional layers, thereby limiting access to the resources of the system.

28 Claims, 4 Drawing Sheets

U.S. PATENT DOCUMENTS

| | | | |
|---|---|---|---|
| 5,659,734 | A | 8/1997 | Tsuruta |
| 5,664,182 | A | 9/1997 | Nirenberg |
| 5,692,181 | A | 11/1997 | Anand |
| 5,781,911 | A | 7/1998 | Young |
| 5,864,856 | A | 1/1999 | Young |
| 5,878,416 | A | 3/1999 | Harris |
| 5,914,878 | A | 6/1999 | Yamamoto |
| 5,935,218 | A | 8/1999 | Beyda |
| 6,003,045 | A | 12/1999 | Freitas |
| 6,003,101 | A | 12/1999 | Williams |
| 6,012,066 | A | 1/2000 | Discount |
| 6,085,193 | A | 7/2000 | Malkin |
| 6,154,766 | A | 11/2000 | Yost |
| 6,247,008 | B1 | 6/2001 | Cambot |
| 6,279,033 | B1 | 8/2001 | Selvarajan |
| 6,341,290 | B1* | 1/2002 | Lombardo et al. ....... 707/104.1 |
| 6,505,031 | B1* | 1/2003 | Slider et al. ................. 434/350 |
| 6,782,431 | B1* | 8/2004 | Mukherjee et al. .......... 709/246 |
| 7,051,106 | B2* | 5/2006 | Grobler et al. .............. 709/228 |
| 2002/0165749 | A1* | 11/2002 | Northcutt et al. ............... 705/8 |

OTHER PUBLICATIONS

Trevor Schroeder, Steve Goddard, Byrav Ramamurthy, Scalable Web Server Clustering Technologies, May/Jun. 2000, University of Nebraska-Lincoln, p. 38-45.

Eric Levy-Abegnoli, Arun Iyengar, Junehwa Soong, Daniel Dias, Design and Performance of a Web Server Accelerator, T.J. Watson Research Center, Yorktown Heights, NY, Jun. 1999, 9 pages.

P. Srisuresh, D. Gan, Load Sharing using IP Network Address Translation, Juniper Networks, Inc., Aug. 1998, p. 1-18.

Nozer D. Singpurwalla, Determining an Optimal Time Interval for Testing and Debugging Software, IEEE Transactions on Software Engineering, vol. 17, No. 4, Apr. 1991, p. 313-319.

Carmen Trammell, Quantifying the Reliability of Software: Statistical Testing Based on a Usage Model, Proceedings of the $2^{nd}$ IEEE Software Engineering Standards Symposium, 1995, Department of Computer Science, University of Tennessee, Knoxville, TN, p. 208-218.

Andrew S. Tanenbaum, Distributed Operating Systems, Prentice Hall, Upper Saddle River, New Jersey, p. 245-375.

Business Objects User's Guide; Version 5.1 for Windows; Business Objects 2000; 654 pgs.

Getting Started with Business Objects; Version 5.1 for Windows; Business Objects 2000, 152 pgs.

Business Objects Deployment Guide (Broadcast Agent 5.1; Business Objects 5.1; Web Intelligence 2.6 for Windows and Unix); Business Objects 2000; 360 pgs.

Business Objects Designer's Guide, Version 5.1 for Windows; Business Objects 2000; 272 pgs.

Business Objects Error Message Guide, Version 5.1/2.6 for Windows; Business Objects 2000, 618 pgs.

Business Objects Generic ODBC Access Guide, Version 5.1 for Windows, Business Objects 2000, 98 pgs.

Business Objects Info View User's Guide, for Windows and Unix; Business Objects 2000; 354 pgs.

Business Objects Installation and Update Guide; Business Objects Enterprise Server Products; Business Objects Desktop Products; Business Objects 2000, 252 pgs.

Business Objects MS Access Database Guide, Version 5.1 for Windows; Business Objects 2000, 106 pgs.

Business Objects MS SQL Server Database Guide, Version 5.1 for Windows; Business Objects 2000; 134 pgs.

Business Objections Supervisor's Guide, Version 5.1 for Windows; Business Objects 2000, 362 pgs.

Quick Start MicroStrategy Agent Version 6.0, MicroStrategy Oct. 1999, 15 pgs.

User Guide MicroStrategy Agent Version 6.0, MicroStrategy Oct. 1999, 317 pgs.

User Guide MicroStrategy Architect Version 6.0, MicroStrategy Oct. 1999, 323 pgs.

User Guide MicroStrategy Objects Version 6.0, MicroStrategy Oct. 1999, 378 pgs.

Excel Add-In MicroStrategy Objects Version 6.0, MicroStrategy Oct. 1999, 25 pgs.

User Guide MicroStrategy Intelligence Server Version 6.0, MicroStrategy Oct. 1999; 346 pgs.

User Guide MicroStrategy Administrator Version 6.0, MicroStrategy Oct. 1999; 249 pgs.

Administrator Guide MicroStrategy InfoCenter Version 6.5, MicroStrategy Apr. 2000; 108 pgs.

Advance Topics MicroStrategy Agent; Version 6.0, MicroStrategy Oct. 1999; 308 pgs.

Robert C. Stern, Bruce M. Anderson and Craig W. Thompson, A Menu-Based Natural Language Interface To A Large Database, Texas Instruments Incorporated, P. O. Box 660246, MS 238, Dallas, Texas 75266, NAECON: National Aerospace & Electronics Conference, Dayton, Ohio, May 20-24, 1985.

Harry R. Tennant, Kenneth M. Ross, Richard M. Saenz, Craig W. Thompson, and James R. Miller, Computer Science Laboratory, Central Research Laboratories, Texas Instruments Incorporated, Dallas, Texas, 21st Annual Meeting of the Association for Computational Linguistics, MIT, Jun. 1983, pp. 151-158.

Harry R. Tennant, Member, IEEE, Roger R. Bate, Member, IEEE, Stephen M. Corey, Lawrence Davis, Paul Kline, LaMott G. Oren, Malipatola Rajinikanth, Richard Saenz, Daniel Stenger, Member, IEEE, and Craig W. Thompson, Software Innovations for the Texas Instruments Explorer Computer, Proceedings of the IEEE, vol. 73, No. 12, Dec. 1985.

Craig W. Thompson, Kenneth M. Ross, Harry R. Tennant and Richard M. Saenz, Building Usable Menu-Based Natural Language Interfaces to Databases, Proceedings of the Ninth International Conference on Very Large Data Bases, Florence, Italy, Oct. 31-Nov. 2, 1983, pp. 43-55.

Craig W. Thompson, John Kolts, and Kenneth W. Ross, A Toolkit for Building "Menu-Based Natural Language" Interfaces, Texas Instruments Incorporated, P. O. Box 226015, MS 238, Dallas, Texas 75265, 1985.

Craig Warren Thompson, M.A., B.A., Using Menu-Based Natural Language Understanding to Avoid Problems Associated with Traditional Natural Language Interfaces to Databases, Dissertation Presented to the Faculty of the Graduate School of The University of Texas at Austin, May 1984.

* cited by examiner

TECHNIQUE FOR LIMITING ACCESS TO THE RESOURCES OF A SYSTEM

CROSS-REFERENCE TO RELATED APPLICATIONS

This application is a continuation of U.S. patent application Ser. No. 10/043,258, filed Jan. 14, 2002, now abandoned, which is a continuation of U.S. patent application Ser. No. 09/884,470, filed Jun. 20, 2001, now abandoned. The contents of both applications are incorporated herein by reference in their entireties.

FIELD OF THE INVENTION

The present invention relates generally to system governing techniques and, more particularly, to a technique for limiting access to the resources of a system, and for controlling the utilization of the resources of the system.

BACKGROUND OF THE INVENTION

The ability to act quickly and decisively in today's increasingly competitive marketplace is critical to the success of any organization. The volume of data that is available to organizations is rapidly increasing and frequently overwhelming. The availability of large volumes of data presents various challenges. One challenge is to avoid inundating an individual with unnecessary information. Another challenge is to ensure all relevant information is available in a timely manner.

One known approach to addressing these and other challenges is known as data warehousing. Data warehouses, relational databases, and data marts are becoming important elements of many information delivery systems because they provide a central location where a reconciled version of data extracted from a wide variety of operational systems may be stored. As used herein, a data warehouse should be understood to be an informational database that stores shareable data from one or more operational databases of record, such as one or more transaction-based database systems. A data warehouse typically allows users to tap into a business's vast store of operational data to track and respond to business trends that facilitate forecasting and planning efforts. A data mart may be considered to be a type of data warehouse that focuses on a particular business segment.

Decision support systems (DSS's) have been developed to efficiently retrieve selected information from data warehouses. One type of decision support system is known as an on-line analytical processing system (OLAP). In general, OLAP systems analyze the data from a number of different perspectives and support complex analyses against large input data sets.

There are at least three different types of OLAP architectures: Relational On-Line Analytical Processing (ROLAP), Multidimensional On-Line Analytical Processing (MOLAP) and Hybrid On-Line Analytical Processing (HOLAP). ROLAP systems use a dynamic server connected to a relational database system. MOLAP systems utilize a proprietary multidimensional database (MDDB) to provide OLAP analyses. The main premise of this architecture is that data must be stored multidimensionally to be viewed multidimensionally. HOLAP systems are a hybrid of the other two.

ROLAP is a three-tier, client/server architecture comprising a presentation tier, an application logic tier, and a relational database tier. The relational database tier stores data and connects to the application logic tier. The application logic tier comprises a ROLAP engine that executes multidimensional reports from multiple end users. The ROLAP engine integrates with a variety of presentation layers, through which users perform OLAP analyses. The presentation layers enable users to provide requests to the ROLAP engine. The premise of ROLAP is that OLAP capabilities are best provided directly against a relational database (e.g., the data warehouse).

In a ROLAP system, data from transaction-processing systems is loaded into a defined data model in the data warehouse. Database routines are run to aggregate the data, if required by the data model. Indices are then created to optimize query access times. End users submit multidimensional analyses to the ROLAP engine, which then dynamically transforms the requests into standard query language (SQL) execution plans. The SQL is submitted to the relational database for processing, the relational query results are cross-tabulated, and a multidimensional result set is returned to the end user. ROLAP is a fully dynamic architecture capable of utilizing pre-calculated results when they are available, or dynamically generating results from atomic information when necessary.

The ROLAP architecture directly accesses data from data warehouses, and therefore supports optimization techniques to meet batch window requirements and to provide fast response times. These optimization techniques typically include application level table partitioning, aggregate inferencing, denormalization support, and multiple fact table joins.

MOLAP is a two-tier, client/server architecture. In this architecture, the MDDB serves as both the database layer and the application logic layer. In the database layer, the MDDB system is responsible for all data storage, access, and retrieval processes. In the application logic layer, the MDDB is responsible for the execution of all OLAP requests. The presentation layer integrates with the application logic layer and provides an interface through which the end users view and request OLAP analyses. The client/server architecture allows multiple users to access the multidimensional database.

Information from a variety of transaction-processing systems is loaded into the MDDB system through a series of batch routines. Once this atomic data has been loaded into the MDDB, the general approach is to perform a series of batch calculations to aggregate along the orthogonal dimensions and fill the MDDB array structures. For example, revenue figures for all of the stores in a state would be added together to fill the state level cells in the database. After the array structure in the database has been filled, indices are created and hashing algorithms are used to improve query access times. Once this compilation process has been completed, the MDDB is ready for use. Users request OLAP reports through the presentation layer, and the application logic layer of the MDDB retrieves the stored data.

The MOLAP architecture is a compilation-intensive architecture. It principally reads the pre-compiled data, and has limited capabilities to dynamically create aggregations or to calculate business metrics that have not been pre-calculated and stored.

The HOLAP solution is a mix of MOLAP and relational architectures that support inquiries against summary and transaction data in an integrated fashion. The HOLAP approach enables a user to perform multidimensional analysis on data in the MDDB. However, if the user reaches the bottom of the multidimensional hierarchy and requires more detailed data, the HOLAP engine generates an SQL to retrieve the detailed data from a source relational database management system (RDBMS) and returns it to the end user.

HOLAP implementations rely on simple SQL statements to pull large quantities of data into the mid-tier, multidimensional engine for processing. This constrains the range of inquiry and returns large, unrefined result sets that can overwhelm networks with limited bandwidth.

As described above, each of these types of OLAP systems are typically client-server systems. The OLAP engine resides on the server-side and a module is typically provided at a client-side to enable users to input queries and report requests to the OLAP engine. In some systems, such queries and report requests are accepted by the system regardless of a present load on the system. Thus, if the system is heavily loaded, a user may have to wait a long amount of time before getting a response to a query or a report request. Also, some systems allow an unlimited number of users to obtain access to the system. This can load down a system such that all users receive poor response time from the system. Furthermore, some systems may accept queries or report requests that are too large for the system to handle, or are incorrectly formatted, such that the system spends all or most of its time trying to service the too large or incorrectly formatted queries or report requests, to the detriment of all other users.

In view of the foregoing, it would be desirable to provide a technique for processing queries and report requests which overcomes the above-described inadequacies and shortcomings. More particularly, it would be desirable to provide a technique for limiting access to the resources of a system, and for controlling the utilization of the resources of the system, in an efficient and cost effective manner.

SUMMARY OF THE INVENTION

According to the present invention, a technique for limiting access to the resources of a system, and for controlling the utilization of the resources of the system, is provided. In one embodiment, wherein the system has a server for processing requests, and wherein the server supports a plurality of projects, the technique includes receiving a request to access the resources of the system. The system is preferably a reporting system (e.g., a business intelligence system). The request is denied based upon an application level and a setting level, wherein the application level is associated with one of a plurality of functional layers within the system that is affected by the request, and wherein the setting level is a limiting value associated with one of the server alone and the server with one or more of the plurality of projects. The limiting value limits an operation on one of the plurality of functional layers, thereby limiting access to the resources of the system.

In accordance with other aspects of the present invention, the request may be received from a user, or from within the system itself from, for example, a scheduled service (e.g., a monthly inventory report) which a user may subscribe to.

In accordance with further aspects of the present invention, a user may be notified that the request has been denied.

In accordance with still further aspects of the present invention, wherein each project supports a plurality of sessions, and each session is created from a request, when the request is denied, the request is prevented from becoming a session.

In accordance with another aspect of the present invention, wherein each project supports a plurality of sessions, each session supports a plurality of jobs, and each job is created from a request, when the request is denied, the request is prevented from becoming a job.

In accordance with still another aspect of the present invention, the plurality of functional layers include a user layer, a job layer, a session layer, a project layer, and a server layer.

In accordance with additional aspects of the present invention, the setting level may be beneficially set such that limiting the operation affects all jobs and all users across all projects. Alternatively, the setting level may be beneficially set such that limiting the operation affects all jobs and a single user across all projects. Alternatively still, the setting level may be beneficially set such that limiting the operation affects all jobs and all users within a single project. As another alternative, the setting level may be beneficially set such that limiting the operation affects all jobs and a single user within a single project. In another alternative, the setting level may be beneficially set such that limiting the operation affects all jobs and all users within a user group (e.g., a group of users) across all projects. In still another alternative, wherein the request is a request to generate at least one report, the setting level may be beneficially set such that limiting the operation affects a single instance of a report.

In another embodiment of the present invention, after receiving a request to access the resources of the system, it is determined if the resources of the system are available to satisfy the request. If not, then the request is queued until the resources of the system are available to satisfy the request. In this case, the availability of the resources of the system is based upon the application level and the setting level. Another aspect of this embodiment of the present invention is that a user may be notified that the limiting value has been reached.

In yet another embodiment of the present invention, after receiving a request to access the resources of the system, it is determined how much of the resources of the system are allowed to process the request. The request is then partially processed until the resources of the system are no longer allowed to process the request. In this case, the availability of the resources of the system is based upon the application level and the setting level. Similar to above, another aspect of this embodiment of the present invention is that a user may be notified that the limiting value has been reached. A further aspect of this embodiment of the present invention is that a partial result may be provided to a user based upon the partial processing of the request.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 1:
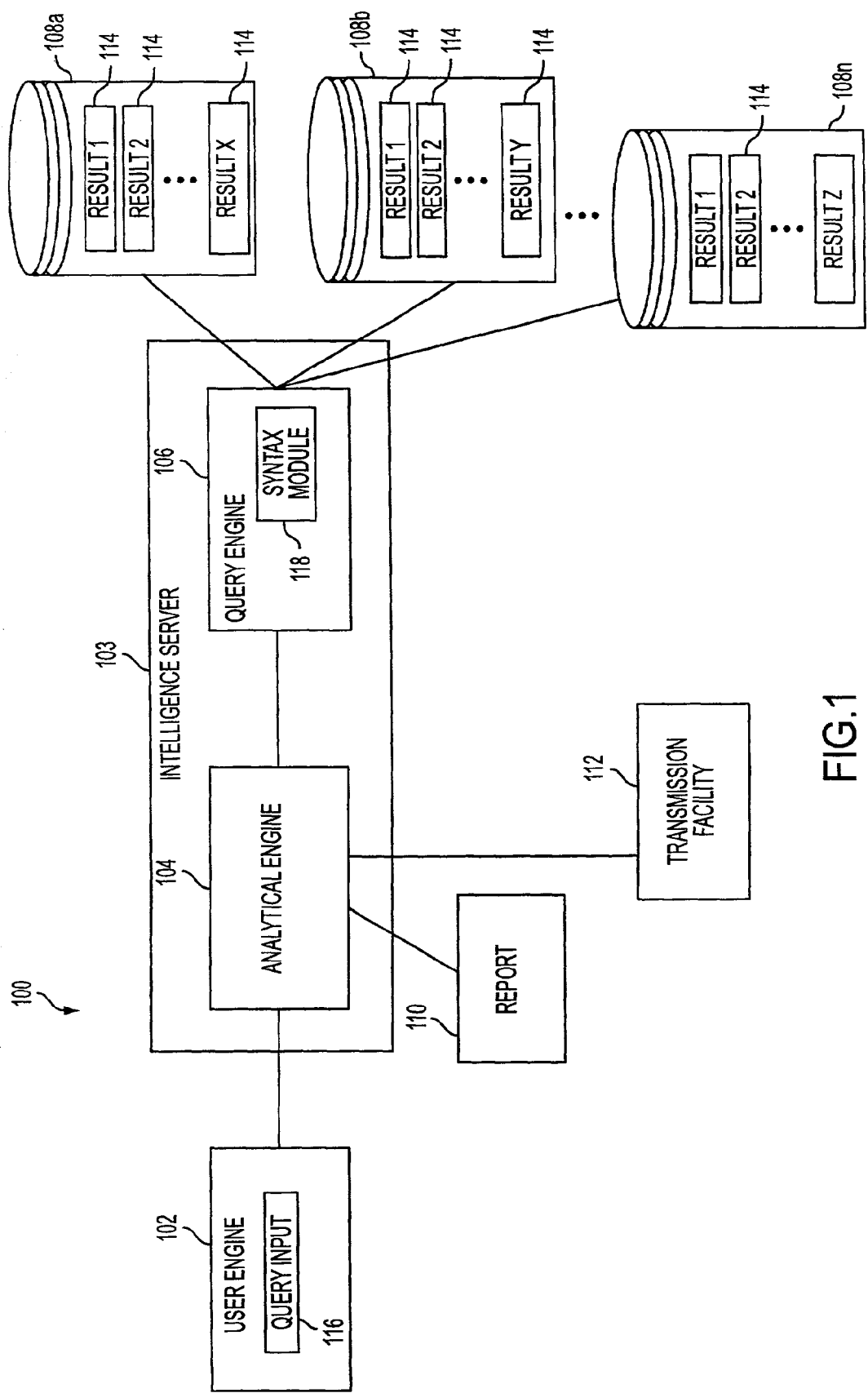
FIG. 1 is a block diagram illustrating an architecture for a system according to an embodiment of the invention.

FIG. 1 is a block diagram illustrating a system 100 by which a variety of data resources may be accessed for business analytic, report generation and other intelligence purposes according to an embodiment of the invention. According to a preferred embodiment, the system 100 may comprise an Online Analytical Processing (OLAP) decision support system (DSS). In particular, FIG. 1 may comprise a portion of the MicroStrategy 7 or 7.1 platform which provides a preferred system in which the present invention may be implemented.

In general, through using the system 100 of the invention, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods of the invention. This is in part because the size and complexity of some data portfolios stored in such databases or database arrays may mask those trends.

In addition, system 100 may enable the creation of reports or services that are processed according to a schedule. Users may then subscribe to the service, provide personalization criteria and have the information automatically delivered to the user, as described in U.S. Pat. No. 6,154,766 to Yost et al., which is commonly assigned and hereby incorporated by reference.

As illustrated in FIG. 1, a business, a government or another user may access the resources of the system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the system 100, according to a query received from the user engine 102.

The analytical engine 104 may communicate with a query engine 106, which in turn interfaces to one or more data storage devices 108a, 108b . . . 108n (where n is an arbitrary number). The data storage devices 108a, 108b . . . 108n may include or interface to a relational database or another structured database stored on a hard disk, an optical disk, a solid state device or another similar storage media. When implemented as databases, the data storage devices 108a, 108b . . . 108n may include or interface to, for example, an Oracle™ relational database such as sold commercially by Oracle Corporation, an Informix™ database, a Database 2 (DB2) database, a Sybase™ database, or another data storage device or query format, platform or resource such as an OLAP format, a Standard Query Language (SQL) format, a storage area network (SAN), or a Microsoft Access™ database. It should be understood that while data storage devices 108a, 108b . . . 108n are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a Microsoft Windows™ NT™ operating system, a Windows™ 2000 operating system, a Unix operating system, a Linux operating system, a Xenix operating system, an IBM AIX™ operating system, a Hewlett-Packard UX™ operating system, a Novell Netware™ operating system, a Sun Microsystems Solaris™ operating system, an OS/2™ operating system, a BeOS™ operating system, a Macintosh operating system, an Apache platform, an OpenStep™ operating system, or another similar operating system or platform. According to one embodiment of the present invention, analytical engine 104 and query engine 106 may comprise elements of an intelligence server 103.

The data storage devices 108a, 108b . . . 108n may be supported by a server or another resource and may, in some embodiments, include redundancy, such as a redundant array of independent disks (RAID), for data protection. The storage capacity of any one or more of the data storage devices 108a, 108b . . . 108n may be of various sizes, from relatively small data sets to very large database (VLDB)-scale data sets, such as warehouses holding terabytes of data or more. The fields and types of data stored within the data storage devices 108a, 108b . . . 108n may also be diverse, and may include, for instance, financial, personal, news, marketing, technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108a, 108b . . . 108n. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108a, 108b . . . 108n in its original format. If so, the query engine 106 may directly transmit the query to one or more of the resources of the data storage devices 108a, 108b . . . 108n for processing.

If the transmitted query cannot be processed in its original format, the query engine 106 may perform a translation of the query from an original syntax to a syntax compatible with one or more of the data storage devices 108a, 108b . . . 108n by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108a, 108n . . . 108n for processing. In some embodiments, the query may be processed for one or more hits against one or more databases in the data storage devices 108a, 108b . . . 108n. For example, a manager of a restaurant chain, a retail vendor or another similar user may submit a query to view gross sales made by the restaurant chain or retail vendor in the State of New York for the year 1999. The data storage devices 108*a*, 108*b* . . . 108*n* may be searched for one or more fields corresponding to the query to generate a set of results 114.

Although illustrated in connection with each data storage device 108 in FIG. 1, the results 114 may be generated from querying any one or more of the databases of the data storage devices 108*a*, 108*b* . . . 108*n*, depending on which of the data resources produce hits from processing the search query. In some embodiments of the system 100 of the invention, the results 114 may be maintained on one or more of the data storage devices 108*a*, 108*b* . . . 108*n* to permit one or more refinements, iterated queries, joinders or other operations to be performed on the data included in the results 114 before passing the information included in the results 114 back to the analytical engine 104 and other elements of the system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108*a*, 108*b* . . . 108*n*. The report 110 may be presented to the user via the user engine 102, and, in some embodiments, may be temporarily or permanently stored on the user engine 102, a client machine or elsewhere, or printed or otherwise output. In some embodiments of the system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the Narrowcaster™ platform or Telecaster™ service sold by MicroStrategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Additionally, as described in the '766 patent, an administrative level user may create a report as part of a service. Subscribers/users may then receive access to reports through various types of data delivery devices including telephones, pagers, PDAs, WAP protocol devices, email, facsimile, and many others. In addition, subscribers may specify trigger conditions so that the subscriber receives a report only when that condition has been satisfied, as described in detail in the '766 patent. The platform of FIG. 1 may have many other uses, as described in detail with respect to the MicroStrategy 7 and 7.1 platform, the details of which will be appreciated by one of ordinary skill in the reporting and decision support system art.

Figure 2:
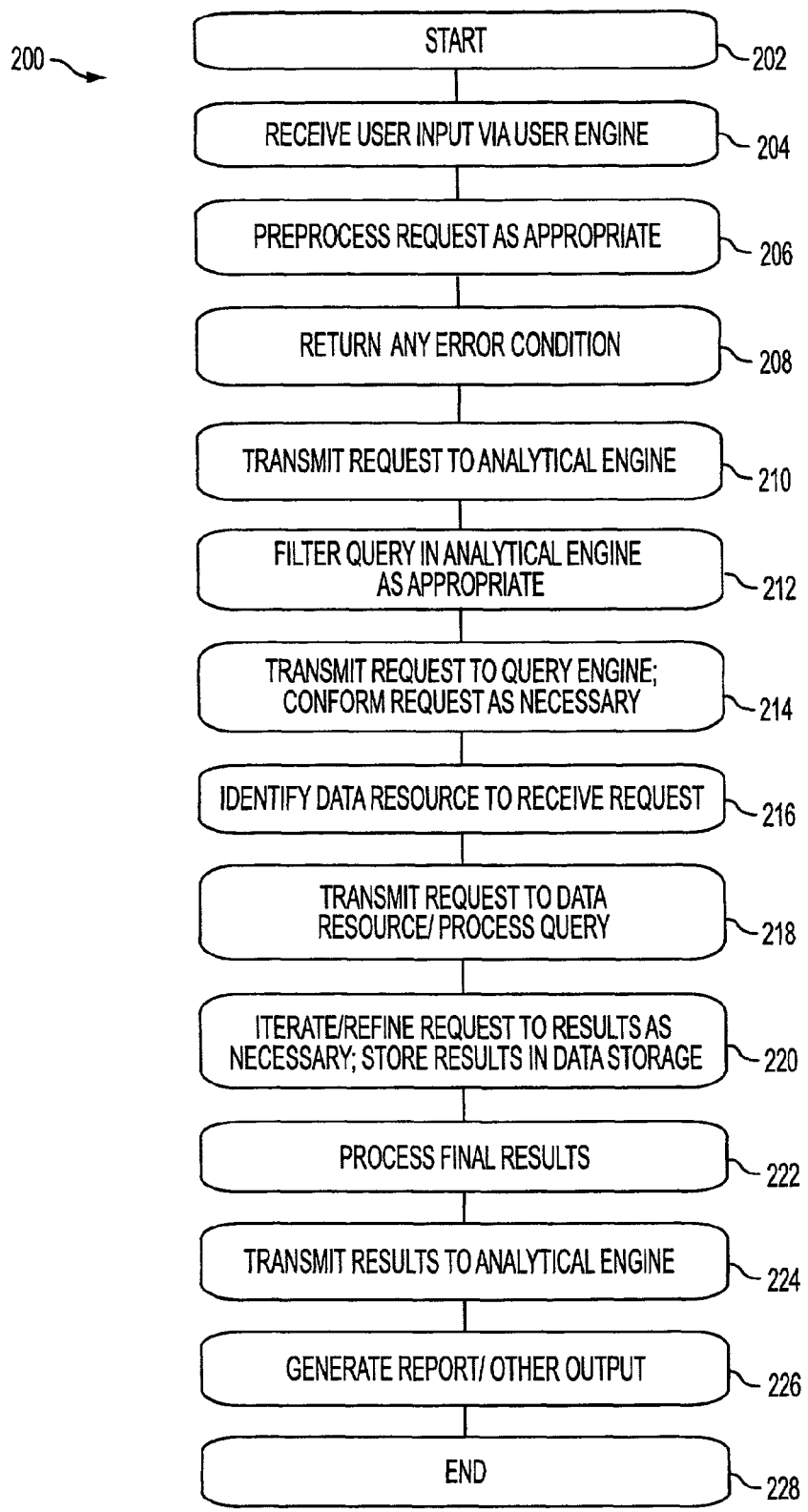
FIG. 2 is a flowchart illustrating steps performed by a process utilizing a query engine according to an embodiment of the invention.

The steps performed in a method 200 for processing data according to the invention are illustrated in the flowchart of FIG. 2. In step 202, the method 200 begins. In step 204, the user may supply input, such as a query or a request for information, via the user engine 102. In step 206, the user input query may be preliminarily processed, for instance, to determine whether it includes valid fields and for other formatting and error-flagging issues. In step 208, any error conditions may be trapped and an error message presented to the user, for correction of the error conditions. In step 210, if a query is in a valid format, the query may then be transmitted to the analytical engine 104.

In step 212, the analytical engine 104 may further process the input query as appropriate to ensure the intended results 114 may be generated to apply the desired analytics. In step 214, the query engine 106 may further filter, format and otherwise process the input query to ensure that the query is in a syntax compatible with the syntax of the data storage devices 108*a*, 108*b* . . . 108*n*. In step 216, one or more appropriate databases or other resources within the data storage devices 108*a*, 108*b* . . . 108*n* may be identified to be accessed for the given query.

In step 218, the query may be transmitted to the data storage devices 108*a*, 108*b* . . . 108*n* and the query may be processed for hits or other results 114 against the content of the data storage devices 108*a*, 108*b* . . . 108*n*. In step 220, the results 114 of the query may be refined, and intermediate or other corresponding results 114 may be stored in the data storage devices 108*a*, 108*b* . . . 108*n*. In step 222, the final results 114 of the processing of the query against the data storage devices 108*a*, 108*b* . . . 108*n* may be transmitted to the analytical engine 104 via the query engine 106. In step 224, a plurality of analytical measures, filters, thresholds, statistical or other treatments may be run on the results 114. In step 226, a report 110 may be generated. The report 110, or other output of the analytic or other processing steps, may be presented to the user via the user engine 102. In step 228, the method 200 ends.

Returning to FIG. 1, whenever the query input module 116 accepts a search, query, or other request for processing by the analytical engine 104, the request may be associated with a project, a session, and a job. That is, a project may be set up whereby the data storage devices 108 may contain several different types of data, and any requests that are associated with any one of the several different types of data are typically assigned to the same project. Accordingly, there may be a project, or multiple projects, associated with each type of data.

A session is typically established whenever a user initially attempts to access the system 100 via the user engine 102. Each session is typically established to request certain data that is typically associated with a specific project. Thus, each session is typically associated with a specific project. It should be noted that multiple sessions may be established for each project.

A job is a type of user request that is made during a session. The user that made the request is called the owner of the job. All jobs are made up of tasks, which are typically carried out by the analytical engine 104, the query engine 106, or both. It should be noted that multiple requests may be made during each session, and thus each session may have multiple jobs.

Figure 3:
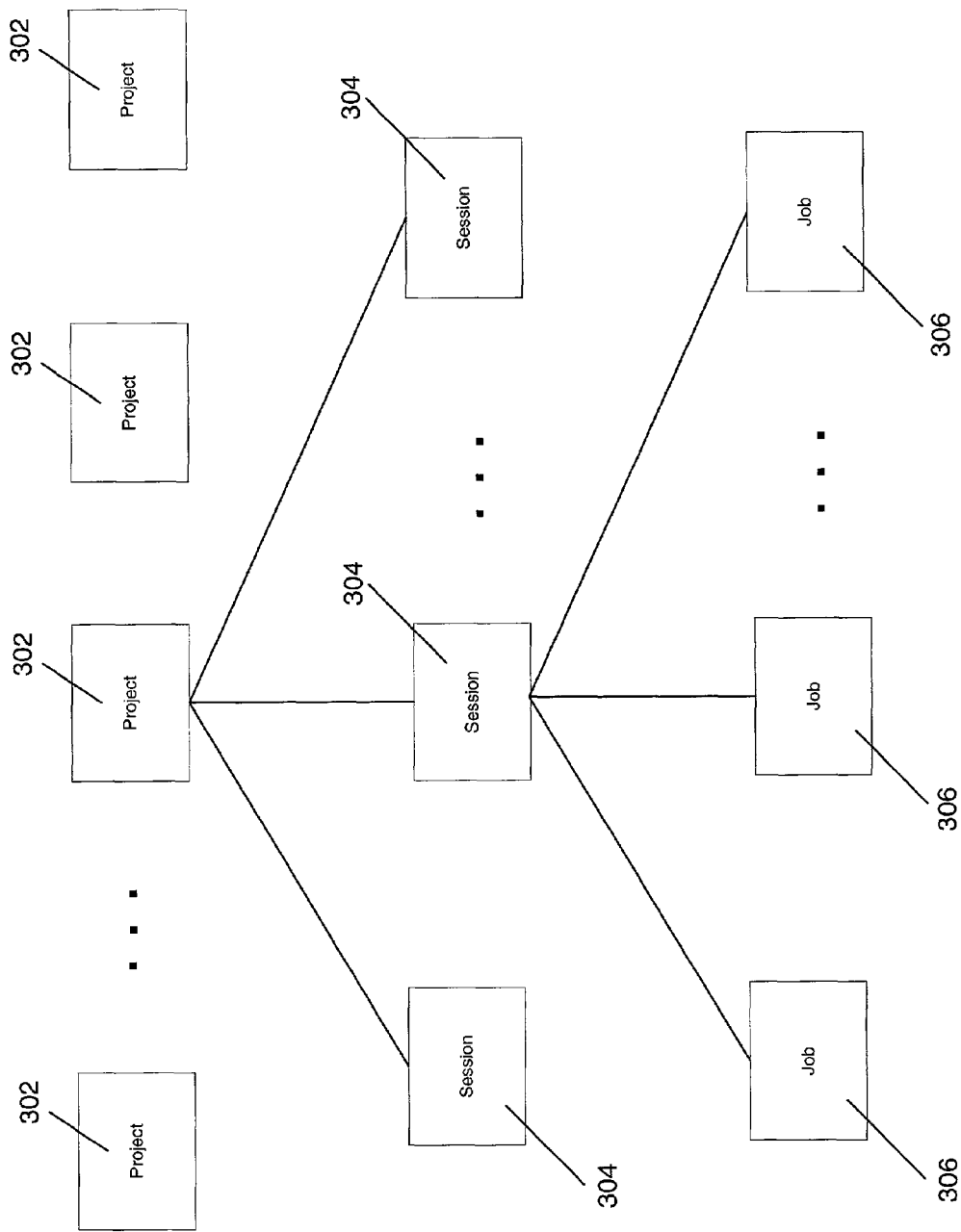
FIG. 3 is an illustration of the hierarchy of projects, sessions, and jobs, in accordance with the present invention.

Referring to FIG. 3, there is shown an illustration of the hierarchy 300 of projects 302, sessions 304, and jobs 306, as described above, in accordance with the present invention. As shown, for each project 302 there may be multiple sessions 304, and for each session 304 there may be multiple jobs 306.

Figure 4:
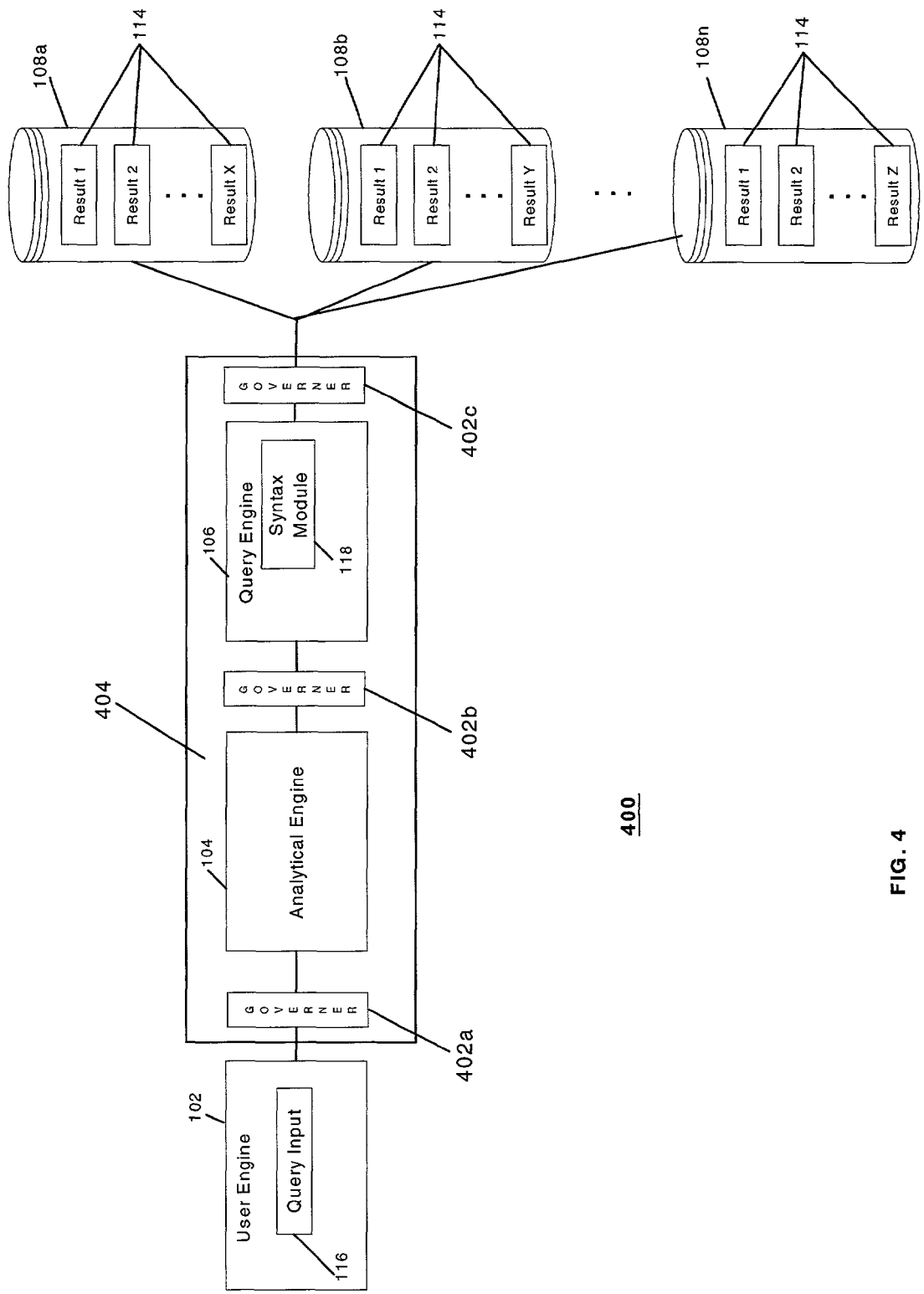
FIG. 4 is a block diagram illustrating a system having a plurality of governors for limiting access to resources of the system in accordance with the present invention.

Referring to FIG. 4, there is shown a particular embodiment of the present invention, wherein a system 400 comprises the user engine 102, the analytical engine 104, the query engine 106, and the plurality of data storage devices 108. The system 400 also comprises a plurality of governors 402 for limiting access to resources of the system 400 (e.g., to the analytical engine 104, the query engine 106, and the plurality of data storage devices 108), and to the system 400 in general. In FIG. 4, the governors 402 are shown disposed at the interfaces of the system components (i.e., between the user engine 102 and the analytical engine 104, between the analytical engine 104 and the query engine 106, and between the query engine 106 and the plurality of data storage devices 108). However, the governors 402 may also be, and typically are, employed within each of the system components (i.e., within the user engine 102, the analytical engine 104, the query engine 106, and the plurality of data storage devices 108).

At this point it should be noted that in the system 400 of FIG. 4, the analytical engine 104, the query engine 106, and the plurality of governors 402 are all grouped together within a server 404, which performs all of the functions associated with the analytical engine 104, the query engine 106, and the plurality of governors 402. It should also be noted, however, that the present invention is not limited in this regard. For example, in an alternative embodiment of the present invention, the analytical engine 104 and the query engine 106 may each be located within separate servers, across servers, or by themselves, and the plurality of governors 402 may be located therewith.

Before discussing the different types of the plurality of governors 402, it is important to discuss the levels at which the plurality of governors 402 are configured within the system 400. That is, for each of the plurality of governors 402, there is a setting level and an application level. The setting level is where each governor 402 is set, while the application level is where each governor 402 is applied. For example, the maximum jobs 306 per user may be set at a server setting level. Thus, a governor 402 is created that prevents the submission of jobs 306 when the threshold number of jobs 306 is exceeded, and this governor 402 applies to all jobs 306 that come into the server 404. The setting level is at the server setting level, since the governor 402 affects all jobs 306 and all users within the server 404. The application level is at the user level, since the governor 402 is concerned with the number of jobs 306 per user.

The server 404 supports multiple setting levels in order to give an administrator of the system 400 convenient ways to configure the governors 402. The list of possible setting levels includes: a server setting level whereat a governor 402 affects all jobs 306 and all users across all projects 302; a server-user setting level whereat the governor 402 affects all jobs 306 and a single user across all projects 302; a server-project setting level whereat the governor 402 affects all jobs 306 and all users within a single project 302; a server-project-user setting level whereat the governor 402 affects all jobs 306 and a single user within a single project 302; a server-project-user group setting level whereat the governor 402 affects all jobs 306 and all users within a user group (i.e., a group of users) across all projects 302; and a report setting level whereat the governor 402 affects a single instance of a report 110.

Each application level corresponds to a functional layer of the system 400 (e.g., a user layer, a job layer, a session layer, a project layer, and a server layer). Any governors 402 that vary by application level are considered as different governors 402. For example, a governor 402 that limits the maximum number of jobs 306 per user is a fundamentally different governor than a governor 402 that limits the maximum number of jobs 306 per project 302. Thus, the use of application levels simply becomes a convenient way to group governors 402. The list of possible application levels includes: a server application level, a server-project application level, a server-project-user application level, a server-project-shared login application level, a server-project-user connection application level, and a server-project-user connection-job application level.

All governors 402 are enforced within the context of the server 404 and a project 302 (except for those applied at a server level, which do not require a project context). Thus, each setting level is a limiting value associated with the server 404 alone or the server 404 with one or more projects 302.

An order of precedence must be established among the setting levels that are valid for each governor 402. For example, it is possible to assign the maximum jobs 306 per user at a user setting level and a server setting level. Whenever a governor 402 has been set at multiple setting levels, the lowest setting level will take precedence. The setting levels, from highest to lowest, are the server setting level, the server-user setting level, the server-project setting level, the server-project-user setting level, and the report setting level.

In addition, each governor 402 has a default at the highest setting level at which it can be set. For example, maximum jobs 306 per user will have a default set at the server setting level. This guarantees that each governor 402 has a valid value.

A first type of governor 402 is a job governor 402. All job governors 402 are applied at the job level. Each job governor 402 applies to a single job 306 such as, for example, a report request.

For one particular type of job governor 402, a limit on the maximum number of rows in a result 114 is set at a server-project setting level. This limits the size of the result of a report request. The purpose of this type of job governor 402 is to protect the server 404 from the burden of processing large result sets and to protect a user from having to receive large result sets. The theory behind this type of job governor 402 is that no user should be able to accidentally, or intentionally, choke the server 404. If the limit for this type of job governor 402 is exceeded, the report request fails, and the result rows that are within the limit are not returned to the user.

For another type of job governor 402, another limit on the maximum number of rows in a result 114 is set at a server-project setting level. Again, this limits the size of the result of a report request. Again, the purpose of this type of job governor 402 is to protect the server 404 from the burden of processing large result sets and to protect a user from having to receive large result sets. Again, the theory behind this type of job governor 402 is that no user should be able to accidentally, or intentionally, choke the server 404. If the limit for this type of job governor 402 is met, the report request is partially processed, and the result rows that are within the limit are returned to the user.

For still another type of job governor 402, a limit on the maximum execution time is set at a server-project setting level. This limits the amount of time that any particular job 306 spends executing a report request. The purpose of this type of job governor 402 is to protect a server associated with the data storage devices 108 from processing excessively expensive queries. The theory behind this type of job governor 402 is that no user should be able to accidentally, or intentionally, choke a server associated with the data storage devices 108. If the limit for this type of job governor 402 is exceeded, the report request fails, and an error message is returned to the user.

All job governors 402 are typically located between the query engine 106 and the plurality of data storage devices 108 (e.g., 402c in FIG. 4). However, as previously suggested, job governors 402 may also be located within the analytical engine 104 and/or the query engine 106, or in a server associated with the data storage devices 108.

A second type of governor 402 is a session governor 402. All session governors 402 are applied at the session level. A session 304 may be opened against the server 404 or against a specific project 302 within the server 404. When a user connects to a project 302, two sessions 304 are opened on the server 404: one with a project 302 and one with the server 404 itself.

For one particular type of session governor 402, a limit on the maximum session idle time is set at a server-project setting level. This limits the amount of time (in seconds) a session 304 may remain idle before the server 404 closes it automatically. The purpose of this type of session governor 402 is to clean up sessions 304 that have been abandoned in order to free up resources on the server 404. If a user attempts to make a request via a session 304 that has exceeded the limit, the user will receive an error message, and the request will not be submitted.

For another type of session governor 402, a limit on the maximum number of jobs 306 per user session 304 is set at a server setting level. This limits the number of jobs 306 that can be submitted by a single user within a session 304. The purpose of this type of session governor 402 is to prevent any one user from using a disproportionate amount of the resources of the server 404 and/or a server associated with the data storage devices 108. If a user attempts to submit a request that requires a job 306 after the limit has been reached, the user will receive an error message, and the request will not be submitted and no job 306 will be created.

All session governors 402 are typically located between the user engine 102 and the analytical engine 104 (e.g., 402a in FIG. 4). However, as previously suggested, session governors 402 may also be located within the analytical engine 104 and/or the query engine 106, or in a server associated with the user engine 102.

A third type of governor 402 is a user governor 402. All user governors 402 are applied at the user level. A single user may typically establish multiple sessions 304, and so each user governor 402 applies across all sessions 304 for a given user.

For one particular type of user governor 402, a limit on the maximum number of jobs 306 per user is set at a server-project setting level. This limits the number of jobs 306 that can be submitted by a single user, across all user sessions 304 held by that user. The purpose of this type of user governor 402 is to prevent any one user from using a disproportionate amount of the resources of the server 404. If a user attempts to submit a request that requires a job 306 after the limit has been reached, the user will receive an error message, and the request will not be submitted and no job 306 will be created.

For another type of user governor 402, another limit on the maximum number of jobs 306 per user is set at a server-project setting level. This limits the number of jobs 306 that can be executed by a single user, across all user sessions 304 held by that user. The purpose of this type of user governor 402 is to prevent any one user from using a disproportionate amount of the resources of a server associated with the data storage devices 108. If a user attempts to submit a request that requires a job 306 after the limit has been reached, the request is queued until another job 306 for that user is completed, at which time a job 306 is created for that request and the job 306 is processed.

All user governors 402 are typically located between the user engine 102 and the analytical engine 104 (e.g., 402a in FIG. 4). However, as previously suggested, user governors 402 may also be located within the analytical engine 104 and/or the query engine 106, or in a server associated with the user engine 102.

A fourth type of governor 402 is a project governor 402. All project governors 402 are applied at the project level and consider all jobs 306 and all users within a project 302.

For one particular type of project governor 402, a limit on the maximum number of jobs 306 per project 302 is set at a server-project setting level. This limits the number of jobs 306 that can be submitted against a single project 302. The purpose of this type of project governor 402 is to limit the resources of the server 404 and/or a server associated with the data storage devices 108 that are used by a single project 302. If a user attempts to submit a request that requires a job 306 after the limit has been reached, the user will receive an error message, and the request will not be submitted and no job 306 will be created.

For another type of project governor 402, a limit on the maximum number of user sessions 304 per project 302 is set at a server-project setting level. This limits the number of user sessions 304 that can be opened for a single project 302. The purpose of this type of project governor 402 is to limit the resources of the server 404 and/or a server associated with the data storage devices 108 that are used by a single project 302. If a user attempts to create a session 304 after the limit has been reached, the user will receive an error message and the session 304 will not be opened.

All project governors 402 are typically located between the user engine 102 and the analytical engine 104 (e.g., 402a in FIG. 4). However, as previously suggested, project governors 402 may also be located within the analytical engine 104 and/or the query engine 106, or in a server associated with the user engine 102.

A fifth type of governor 402 is a server governor 402. All server governors 402 are applied at the server level and consider all jobs 306 and all sessions 304 within the server 404.

For one particular type of server governor 402, a limit on the maximum number of jobs 306 on the server 404 is set at a server setting level. This limits the number of jobs 306 that can be submitted against the server 404. The purpose of this type of server governor 402 is to limit the resources of the server 404 and/or a server associated with the data storage devices 108 that are used by the server 404. If a user attempts to submit a request that requires a job 306 after the limit has been reached, the user will receive an error message, and the request will not be submitted and no job 306 will be created.

For another type of server governor 402, a limit on the maximum number of user sessions 304 on the server 404 is set at a server setting level. This limits the number of user sessions 304 that can be opened for the server 404. The purpose of this type of server governor 402 is to limit the resources of the server 404 and/or a server associated with the data storage devices 108 that are used by the server 404. If a user attempts to create a session 304 after the limit has been reached, the user will receive an error message and the session 304 will not be opened. It should again be noted that, as previously described, when a user connects to a project 302, two sessions 304 are opened on the server 404: one with a project 302 and one with the server 404 itself.

All server governors 402 are typically located between the user engine 102 and the analytical engine 104 (e.g., 402a in FIG. 4). However, as previously suggested, server governors 402 may also be located within the analytical engine 104 and/or the query engine 106, or in a server associated with the user engine 102.

A sixth type of governor 402 is a result processing governor 402. All result processing governors 402 are applied at the job level. Each result processing governor 402 applies to a single job 306 such as, for example, a report request.

For one particular type of result processing governor 402, a limit on the maximum execution time for processing a result 114 that is received back from the data storage devices 108 for a particular job 306 is set at a server setting level. This limits the amount of time that the analytical engine 104 spends processing a result 114 that is received back from the data storage devices 108 for a particular job 306. The purpose of this type of result processing governor 402 is to protect the server 404 (i.e., particularly the analytical engine 104) from processing a result 114 that may take an excessive amount of processing time. If the limit for this type of result processing governor 402 is exceeded, the job 306 fails, and an error message is returned to the user.

All report processing governors 402 are typically located between the analytical engine 104 and the query engine 106 (e.g., 402b in FIG. 4). However, as previously suggested, report processing governors 402 may also be located within the analytical engine 104 and/or the query engine 106, or in a server associated with the user engine 102.

A seventh type of governor 402 is a data storage connection governor 402. All data storage connection governors 402 are applied at the server level.

For one particular type of data storage connection governor 402, a limit on the maximum number of connections between the server 404 and the data storage devices 108 is set at a server setting level. This limits the number of connections that can be made connections between the server 404 and the data storage devices 108. The purpose of this type of data storage connection governor 402 is to limit the resources of the server 404 and/or a server associated with the data storage devices 108 that are used by the server 404. If a user attempts to submit a request that requires a connection to be made between the server 404 and the data storage devices 108 after the limit has been reached, the user will receive an error message, and the request will not be submitted and no job 306 will be created.

For another type of data storage connection governor 402, another limit on the maximum number of connections between the server 404 and the data storage devices 108 is set at a server setting level. Again, this limits the number of connections that can be made connections between the server 404 and the data storage devices 108. Again, the purpose of this type of data storage connection governor 402 is to limit the resources of the server 404 and/or a server associated with the data storage devices 108 that are used by the server 404. If a user attempts to submit a request that requires a connection to be made between the server 404 and the data storage devices 108 after the limit has been reached, the request is queued until a connection becomes available, at which time a job 306 is created for that request and the job 306 is processed.

All data storage connection governors 402 are typically located between the query engine 106 and the plurality of data storage devices 108 (e.g., 402c in FIG. 4). However, as previously suggested, data storage connection governors 402 may also be located within the analytical engine 104 and/or the query engine 106, or in a server associated with the data storage devices 108.

At this point it should be noted that the functions associated with any of the above-described governors 402 may be implemented in hardware or software. For example, specific electronic components may be employed in the user engine 102, the analytical engine 104, the query engine 106, and/or the plurality of data storage devices 108 for implementing the functions associated with the above-described governors 402. Alternatively, one or more processors operating in accordance with stored instructions may implement the functions associated with the above-described governors 402. If such is the case, it is within the scope of the present invention that such instructions may be transmitted to the user engine 102, the analytical engine 104, the query engine 106, and/or the plurality of data storage devices 108 via one or more signals.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for limiting access to resources of a system having a server for processing requests, the server supporting a plurality of projects, the method comprising the steps of:
   receiving a request to access the resources of the system; and
   denying the request based upon an application level and a setting level, wherein the application level is associated with one of a plurality of functional layers within the system that is affected by the request, and wherein the setting level is a limiting value associated with one of the server alone and the server with one or more of the plurality of projects, the limiting value for limiting an operation on one of the plurality of functional layers, thereby limiting access to the resources of the system.

2. The method as defined in claim 1, wherein the system is a reporting system.

3. The method as defined in claim 1, wherein the request is received from a user.

4. The method as defined in claim 1, wherein the request is received from within the system.

5. The method as defined in claim 1, further comprising the step of:
   notifying a user that the request has been denied.

6. The method as defined in claim 1, wherein each project supports a plurality of sessions, wherein each session is created from a request, and wherein the step of denying the request includes the step of:
   preventing the request from becoming a session.

7. The method as defined in claim 1, wherein each project supports a plurality of sessions, wherein each session supports a plurality of jobs, wherein each job is created from a request, and wherein the step of denying the request includes the step of:
   preventing the request from becoming a job.

8. The method as defined in claim 7, wherein the plurality of functional layers include a user layer, a job layer, a session layer, a project layer, and a server layer.

9. The method as defined in claim 7, further comprising the step of:
   setting the setting level such that limiting the operation affects all jobs and all users across all projects.

10. The method as defined in claim 7, further comprising the step of:
    setting the setting level such that limiting the operation affects all jobs and a single user across all projects.

11. The method as defined in claim 7, further comprising the step of:
    setting the setting level such that limiting the operation affects all jobs and all users within a single project.

12. The method as defined in claim 7, further comprising the step of:
    setting the setting level such that limiting the operation affects all jobs and all users within a user group across all projects.

13. The method as defined in claim 7, further comprising the step of:
    setting the setting level such that limiting the operation affects all jobs and a single user within a single project.

14. The method as defined in claim 7, wherein the request is a request to generate at least one report, further comprising the step of:
    setting the setting level such that limiting the operation affects a single instance of a report.

15. A computer program of instructions embodied on one or more tangible media and being readable by a computing system for executing a computer process performing the method recited in claim 1.

16. An apparatus for limiting access to resources of a system having a server for processing requests, the server supporting a plurality of projects, the apparatus comprising:
    a receiver for receiving a request to access the resources of the system; and
    a governor for denying the request based upon an application level and a setting level, wherein the application level is associated with one of a plurality of functional layers within the system that is affected by the request, and wherein the setting level is a limiting value associated with one of the server alone and the server with one or more of the plurality of projects, the limiting value for limiting an operation on one of the plurality of functional layers, thereby limiting access to the resources of the system.

17. A computer program embodied on one or more tangible media for limiting access to resources of a system having a server for processing requests, the server supporting a plurality of projects, the computer program comprising:
    instructions configured to be readable by at least one processor and thereby causing the at least one processor to operate so as to:
    receive a request to access the resources of the system; and
    deny the request based upon an application level and a setting level, wherein the application level is associated with one of a plurality of functional layers within the system that is affected by the request, and wherein the setting level is a limiting value associated with one of the server alone and the server with one or more of the plurality of projects, the limiting value for limiting an operation on one of the plurality of functional layers, thereby limiting access to the resources of the system.

18. A method for limiting access to resources of a system having a server for processing requests, the server supporting a plurality of projects, the method comprising the steps of:
    receiving a request to access the resources of the system;
    determining if the resources of the system are available to satisfy the request; and
    queuing the request until the resources of the system are available to satisfy the request, wherein the availability of the resources of the system is based upon an application level and a setting level, wherein the application level is associated with one of a plurality of functional layers within the system that is affected by the request, and wherein the setting level is a limiting value associated with one of the server alone and the server with one or more of the plurality of projects, the limiting value for limiting an operation on one of the plurality of functional layers, thereby limiting access to the resources of the system.

19. The method as defined in claim 18, further comprising the step of:
    notifying a user that the limiting value has been reached.

20. A computer program of instructions embodied on one or more tangible media and being readable by a computing system for executing a computer process performing the method recited in claim 18.

21. An apparatus for limiting access to resources of a system having a server for processing requests, the server supporting a plurality of projects, the apparatus comprising:
    a receiver for receiving a request to access the resources of the system;
    a governor for determining if the resources of the system are available to satisfy the request; and
    a queue for queuing the request until the resources of the system are available to satisfy the request, wherein the availability of the resources of the system is based upon an application level and a setting level, wherein the application level is associated with one of a plurality of functional layers within the system that is affected by the request, and wherein the setting level is a limiting value associated with one of the server alone and the server with one or more of the plurality of projects, the limiting value for limiting an operation on one of the plurality of functional layers, thereby limiting access to the resources of the system.

22. A computer program embodied on one or more tangible media for limiting access to resources of a system having a server for processing requests, the server supporting a plurality of projects, the computer program comprising:
    instructions configured to be readable by at least one processor and thereby causing the at least one processor to operate so as to:
    receive a request to access the resources of the system;
    determine if the resources of the system are available to satisfy the request; and
    queue the request until the resources of the system are available to satisfy the request, wherein the availability of the resources of the system is based upon an application level and a setting level, wherein the application level is associated with one of a plurality of functional layers within the system that is affected by the request, and wherein the setting level is a limiting value associated with one of the server alone and the server with one or more of the plurality of projects, the limiting value for limiting an operation on one of the plurality of functional layers, thereby limiting access to the resources of the system.

23. A method for limiting access to resources of a system having a server for processing requests, the server supporting a plurality of projects, the method comprising the steps of:
    receiving a request to access the resources of the system;
    determining how much of the resources of the system are allowed to process the request; and
    partially processing the request until the resources of the system are no longer allowed to process the request, wherein the allowability of the resources of the system is based upon an application level and a setting level, wherein the application level is associated with one of a plurality of functional layers within the system that is affected by the request, and wherein the setting level is a limiting value associated with one of the server alone and the server with one or more of the plurality of projects, the limiting value for limiting an operation on one of the plurality of functional layers, thereby limiting access to the resources of the system.

24. The method as defined in claim 23, further comprising the step of:
   notifying a user that the limiting value has been reached.

25. The method as defined in claim 23, further comprising the step of:
   providing a partial result to a user based upon the partial processing of the request.

26. A computer program of instructions embodied on one or more tangible media and being readable by a computing system for executing a computer process performing the method recited in claim 23.

27. An apparatus for limiting access to resources of a system having a server for processing requests, the server supporting a plurality of projects, the apparatus comprising:
   a receiver for receiving a request to access the resources of the system;
   a governor for determining how much of the resources of the system are allowed to process the request; and
   a processing engine for partially processing the request until the resources of the system are no longer allowed to process the request, wherein the allowability of the resources of the system is based upon an application level and a setting level, wherein the application level is associated with one of a plurality of functional layers within the system that is affected by the request, and wherein the setting level is a limiting value associated with one of the server alone and the server with one or more of the plurality of projects, the limiting value for limiting an operation on one of the plurality of functional layers, thereby limiting access to the resources of the system.

28. A computer program embodied on one or more tangible media for limiting access to resources of a system having a server for processing requests, the server supporting a plurality of projects, the computer program comprising:
   instructions configured to be readable by at least one processor and thereby causing the at least one processor to operate so as to:
   receive a request to access the resources of the system;
   determine how much of the resources of the system are allowed to process the request; and
   partially process the request until the resources of the system are no longer allowed to process the request, wherein the allowability of the resources of the system is based upon an application level and a setting level, wherein the application level is associated with one of a plurality of functional layers within the system that is affected by the request, and wherein the setting level is a limiting value associated with one of the server alone and the server with one or more of the plurality of projects, the limiting value for limiting an operation on one of the plurality of functional layers, thereby limiting access to the resources of the system.

\* \* \* \* \*